FRANKLYN K. LEVIN
ROBERTO SARMIENTO INVENTOR.

BY John D. Gassett
ATTORNEY

Sept. 28, 1965   F. K. LEVIN ET AL   3,208,548
EARTH LOGGING SYSTEM
Filed May 2, 1962   4 Sheets-Sheet 3

FRANKYN K. LEVIN
ROBERTO SARMIENTO INVENTOR.

BY *John D. Gassett*
ATTORNEY

Sept. 28, 1965 F. K. LEVIN ET AL 3,208,548
EARTH LOGGING SYSTEM
Filed May 2, 1962 4 Sheets-Sheet 4

FRANKLYN K. LEVIN
ROBERTO SARMIENTO INVENTOR.

BY *John D. Gassett*
ATTORNEY

3,208,548
EARTH LOGGING SYSTEM
Franklyn K. Levin and Roberto Sarmiento, Tulsa, Okla., assignors, by mesne assignments, to Esso Production Research Company, Houston, Tex., a corporation of Delaware
Filed May 2, 1962, Ser. No. 191,904
12 Claims. (Cl. 181—.5)

This is a continuation-in-part of applicants' copending application Serial No. 19,230 filed Apr. 1, 1960 and now abandoned.

This invention is directed to the logging of eath strata traversed by a well bore. It relates to the measurement of acoustical properties of subsurface formations. It relates more particularly to the measurements of attenuation of acoustical waves in subsurface formations.

It has been found that it is possible to determine characteristics of subsurface formation, such as rock type, fluid content, and porosity by the attenuation of acoustic waves in the subsurface formations. It is one of the objects of this invention to measure acoustic attenuation effect of elastic waves in the earth's strata penetrated by a borehole.

Briefly in a preferred embodiment, the invention relates to a system for measuring acoustic properties of various earth strata penetrated by a well bore. A logging tool for use in the practice of this invention includes a first or upper sound source spaced from a second or lower sound source. Between the two sound sources are two spaced apart sound detectors. For convenience, the detector closest to the first or upper sound source is designated a first detector and the other a second detector. Means are provided for obtaining the amplitude ratio of a signal as detected at the first and at the second detector of a signal received from the first sound source. Additional means are provided for obtaining a second amplitude ratio of a signal as detected at the second detector and at the first detector received from the second or lower sound source. Ratio obtaining means are provided to obtain the ratio R between the two determined amplitude ratios.

In a preferred manner of operation, the logging tool is lowered into the well bore which penetrates the subsurface strata for which it is desired to determine acoustic properties. The first sound source is activated independently and the sound waves which are transmitted in the rocks surrounding the borehole are detected by the two detectors. As the second detector is farther from the first source than the first detector, the signal received by the second detector will be attenuated or have a smaller amplitude than the signal received by the first detector. The ratio $r_1$ of the amplitude of the signal detected at the first detector and that detected at the second detector is obtained. The second sound source is then activated and the sound pulse or waves which are transmitted in the rock surrounding the borehole are detected first by the second detector and then by the first detector which is farther from the second source than the second detector. The ratio $r_2$ of the acoustical signals from the second sound source detected at the first detector and the second detector is then obtained. R, the ratio of the first and second ratios, is then obtained. R is indicative of the characteristic of the rock between the first source and the second source through which the acoustical waves travel. For example, in general it can be said that the greater R is, the less competent the rock and the greater the porosity. A record of values representative of R is obtained over the interval of the substrata of interest which in effect is a log of the characteristics of the rock of the interval surveyed.

A fuller understanding of the invention and its objects may be had by reference to the following description and claims taken in conjunction with the accompanying drawings in which:

Figure 1:
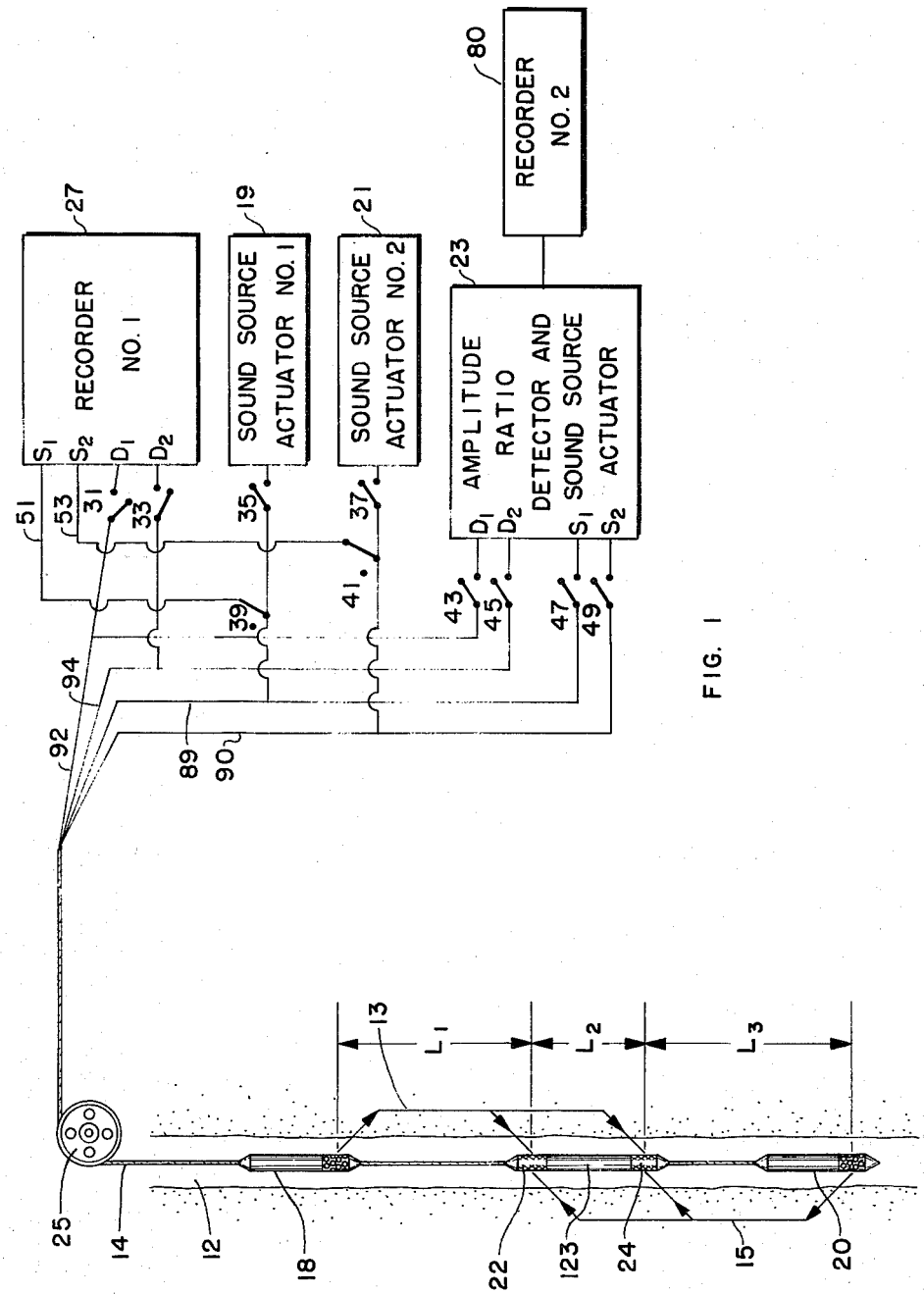
FIG. 1 is a vertical elevation schematic view showing the logging tool positioned in a well bore.

Shown in FIG. 1 is a logging tool suspended in borehole 12 by a multiple conduit cable 14. The multiple conduit cable 14 is supported over controlled powered measuring sheave 25 at the surface of the borehole. The logging tool includes an upper or first sound source 18 and a second or lower sound source 20. Placed between first sound source 18 and second sound source 20 are first detector 22 and second detector 24. When sound source 18 is actuated, a pulse is transmitted as a compressional wave to the borehole fluid into the surrounding formation where it travels via path 13 for example. As the pulse travels through the surrounding formation it is refracted back into the borehole fluid due to the greater seismic velocity characteristic of the formation relative to that of the borehole fluid. The signal is then detected to that each of the pressure sensitive detectors 22 and 24. Likewise, when source 20 is actuated, the primary travel path in the earth is indicated by line 15 to detectors 24 and 22.

Figure 4:
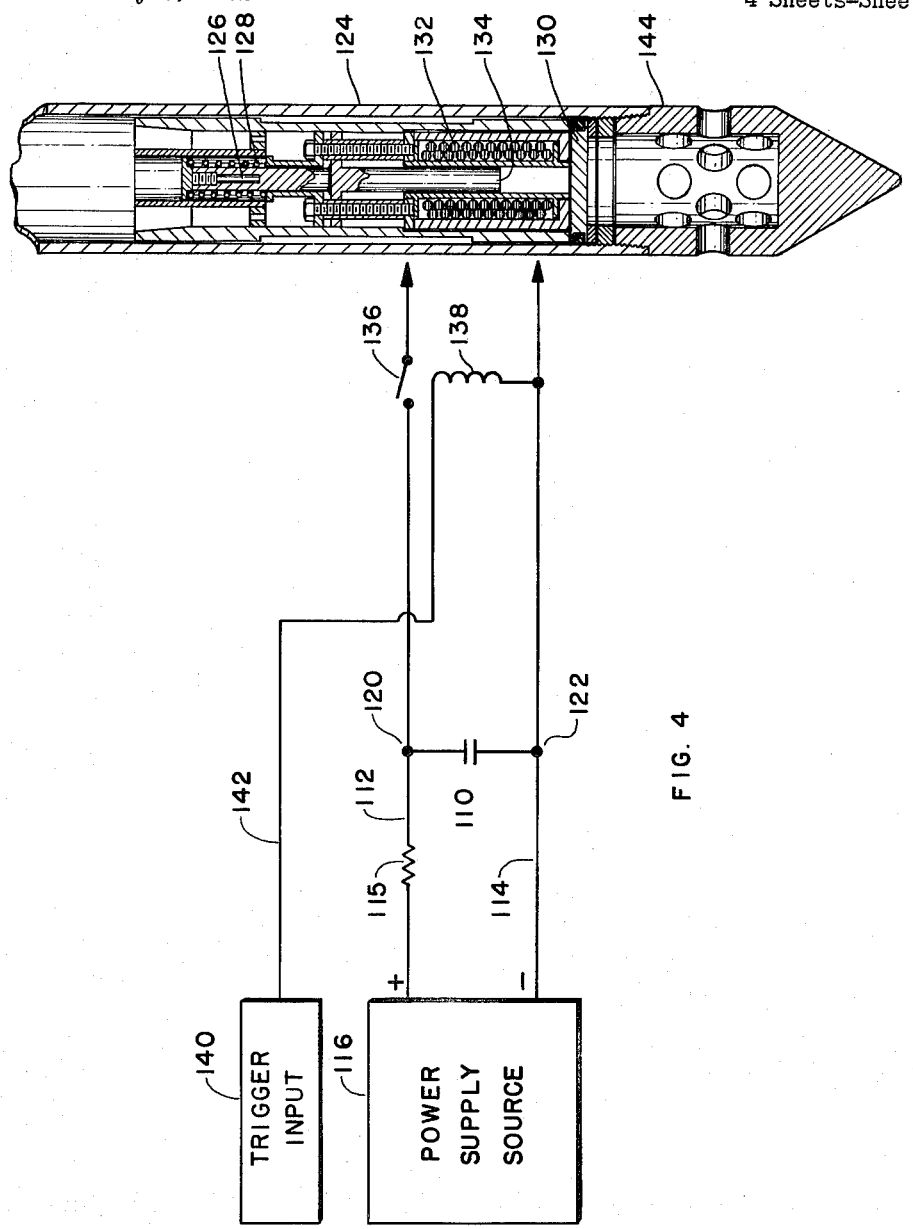
FIG. 4 illustrates a sound source.

Sound sources 18 and 20 may be any conventional sound sources such as piezoelectrical transmitter elements or the like which are capable of producing a rather sharp acoustical signal. A particular suitable sound source is illustrated in FIG. 4 and will be explained in detail hereinafter. The detectors can for example be any device capable of detecting the acoustical signal from the sound source. The receivers may be piezoelectric elements such as barium titanate crystals. The sound detectors are connected together by an acoustical insulating material such as rubber forming the connecting or support tube 123.

Also shown in FIG. 1 are a first recorder 27, first sound source actuator 19, a second sound source actuator 21, amplitude ratio detector and sound source actuator 23 and a second recorder 80 connected thereto. The actuation of sound sources 18 and 20 can be controlled manually by use of sound source actuators 19 and 21 or automatically by use of amplitude ratio detector and and sound source actuator 23 as will be explained hereinafter. Recorder 27 is shown as being a four-channel recorder having taps $S_1$, $S_2$, $D_1$ and $D_2$. Amplitude ratio detector and sound source actuator 23 is shown to have taps $D_1$, $D_2$, $S_1$ and $S_2$. Sound source 18 is connected to the surface through multiple conductor cable 14 by one conductor of multiple conductor 89 which is connectable through switches 35 and 47 respectively to source actuator 19 and the $S_1$ tap of element 23. Sound source 20 is connectable through conductor 90 to a sound actuator 21 and the $S_2$ tap of element 23 through switches 37 and 49 respectively. Detector 22 is connected through conduit 92 to the $D_1$ tap of recorder 27 and the $D_1$ tap of element 23 through switches 31 and 43 respectively. Detector 24 is connected through conduit 94 to the $D_2$ tap of recorder 27 and the $D_2$ tap of element 23 through switches 33 and 45 respectively. The $S_1$ tap of recorder 27 is connected through conduit 51 and switch 39 to conduit 89. The $S_2$ tap of recorder 27 is connected through conduit 53 and switch 41 to conduit 90. When switches 39 and 41 are closed, the sound source actuating pulses can be recorder on recorder 27. The purposes of the various other switches will also become apparent in the description hereinafter.

Reference is now made to FIG. 4 which illustrates in detail a suitable sound source which can be used as sound sources 18 and 20. The components include conductor 112, conductor 114 and conductor 142. Conductor 112 is connected to surface power source 116. Conductor 112 can be one conductor in multiple conductor line 89 for example. The power source can be a 200 volt D.C. system for example. Other voltages could, of course, be used. Power source 16 is preferably located at the surface as an aid in keeping the downhole equipment small in size. Conductor 114 is connected to the negative connection of power supply 116. During operations of the tool a D.C. voltage is constantly impressed across terminals 120 and 122 in conductors 112 and 114 respectively. Capacitor 110 is electrically connected between terminals 120 and 122. A resistor 115 is in conductor 112 between terminal 120 and power source 116.

Also shown in FIG. 4 is a housing 124 in which is mounted anvil 130, solenoid coil 132, and movable slug 134. Movable slug 134 includes an upper extension 126 mounted interior of spring 128 which urges the movable slug upwardly. The negative side of power source 116 is connected through conduit 114 to one end of solenoid coil 132. A relay operated switch 136 operated by relay coil 138 is in conduit 112 between terminal 120 and one end of solenoid coil 132. Relay 138 is operable by a trigger input from trigger input source 140 through conductor 142. When relay 138 is energized, it operates to close switch 136 closing the circuit to solenoid 132 and thus discharging the capacitor 110 into the solenoid winding. The energized solenoid causes slug or hammer means 134 to be pulled down with a great force toward anvil 130. This impact of the slug on the anvil generates the acoustical pulse which is transmitted into the borehole fluid within tip 144 which is attached to the lower end of housing 124. Trigger input 140 preferably only momentarily energizes relay coil 138 so that switch 136 is closed for only a period of time sufficient to permit capacitor 110 to discharge into coil 132 so that the movable slug 134 is forced downwardly with great force against anvil 130. As soon as coil 138 is de-energized, switch 136 opens and spring 128 forces slug extension 126 and slug 134 upwardly to its reset position so that it is again ready to be triggered.

Attention is now directed toward a theoretical analysis of the principle of this invention. In this connection, the following symbols are given the following meanings:

$A_{1d}$=Amplitude detected at detector 22 from source 18.
$A_{2d}$=Amplitude detected at detector 24 from source 18.
$A_{1u}$=Amplitude detected at detector 22 from source 20.
$A_{2u}$=Amplitude detected at detector 24 from source 20.
$A_{01}$=Initial amplitude of signal from source 18.
$A_{02}$=Initial amplitude of signal from source 20.

Figure 2:
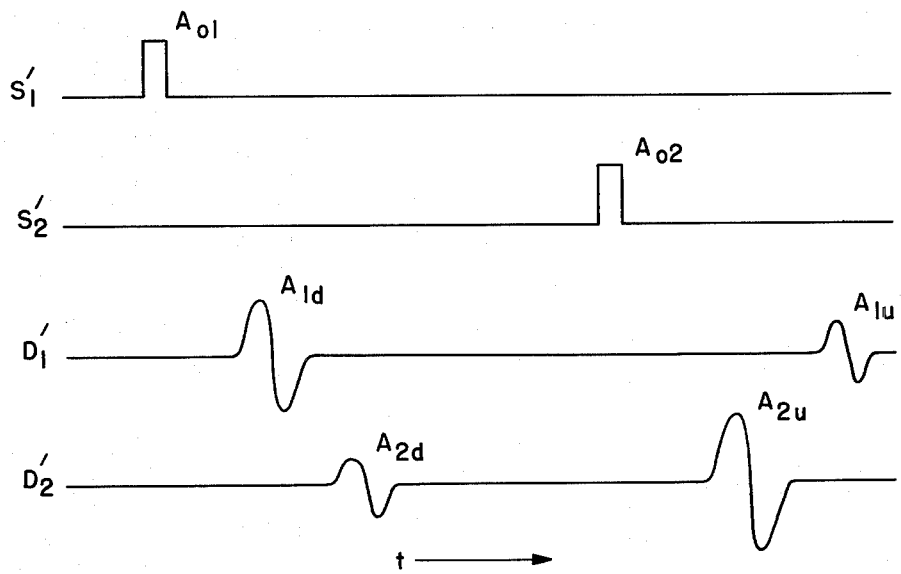
FIG. 2 shows curves representing acoustic pulses generated at the sound sources and received by the detectors.

These terms are perhaps more clearly illustrated by reference to FIG. 2. The curves shown in FIG. 2 are simplified illustrations of the signals transmitted and received and are shown in this form for simplification of the explanation of the invention. A record of such signals, when using sound source actuators 19 and 21, can be obtained on recorder 27 by closing switches 31, 33, 35, 37, 39 and 41. Switches 43, 45, 47 and 49 will normally be open when switches 35 and 37 are closed. Beginning at the top of FIG. 2, $S'_1$ illustrates a signal emitted from the first sound source 18 upon actuation from the actuator 19. The acoustical signal is shown in simplified form to be a square wave having an amplitude of $A_{01}$. This signal is first detected by detector 22 and the detected pulse of interest has an amplitude of $A_{1d}$. The signal is next detected at detector 24 and at that point the detected pulse of interest has an amplitude $A_{2d}$ which is smaller than that signal detected at detector 22.

$S'_2$ illustrates the signal emitted by the second source 20 when actuated by actuator 21. It has an amplitude $A_2$. In this instance, the second detector 24 which is closer to the second sound source 20 detects the signal first; this is illustrated in curve $D'_2$ as having an amplitude of $A_{2u}$ which is larger than the signal received by the first detector which has an amplitude illustrated in curve $D'_1$ as being $A_{1u}$.

The following symbols are used in developing equations hereinafter and are representative of the factors and constant as indicated:

$C_1$=Coupling factor of detector 22.
$C_2$=Coupling factor of detector 24.
$S_1$=Coupling factor of source 18.
$S_2$=Coupling factor of source 20.
$\alpha$=Attenuation constant of rock.

A valid assumption is that the signal from a sound source is attenuated expotentially as it goes through a subsurface formation. Let $L_1$ equal the distance between source 18 and detector 22, $L_2$ equal the distance between detectors and $L_3$ equal the distance between source 20 and detector 24. The following four equations can then be written:

(1) $$A_{1d}=S_1C_1A_{01}e^{-\alpha L_1}$$

(2) $$A_{2d}=S_1C_2A_{01}e^{-\alpha(L_1+L_2)}$$

(3) $$A_{2u}=S_2C_2A_{02}e^{-\alpha L_3}$$

(4) $$A_{1u}=S_2C_1A_{02}e^{-\alpha(L_2+L_3)}$$

The ratio of the amplitude detected at the first detector 22 compared to the amplitude detected at the detector 24 (from source 18) may be expressed by Equation 5.

(5) $$\frac{A_{1d}}{A_{2d}}=\frac{C_1}{C_2}e^{\alpha L_2}$$

Likewise the ratio of the amplitude of the signal detected at detector 22 compared to the ratio of the amplitude detected at detector 24 is given by Equation 6.

(6) $$\frac{A_{1u}}{A_{2u}}=\frac{C_1}{C_2}e^{-\alpha L_2}$$

The ratio of Equation 5 divided by Equation 6 may be represented by R, and is given in the following Equation 7.

(7) $$\frac{A_{1d}/A_{2d}}{A_{1u}/A_{2u}}=R=e^{2\alpha L_2}$$

From this Equations 8 and 9 follow:

(8) $$\log_e R=2\alpha L_2$$

(9) $$\alpha=1/2L_2 \log_e R$$

In a logging operation it is most difficult to accurately determine the coupling factor of an acoustical tool in a borehole containing a fluid. In this system it is not necessary to determine coupling factors as they cancel out.

Figure 3:
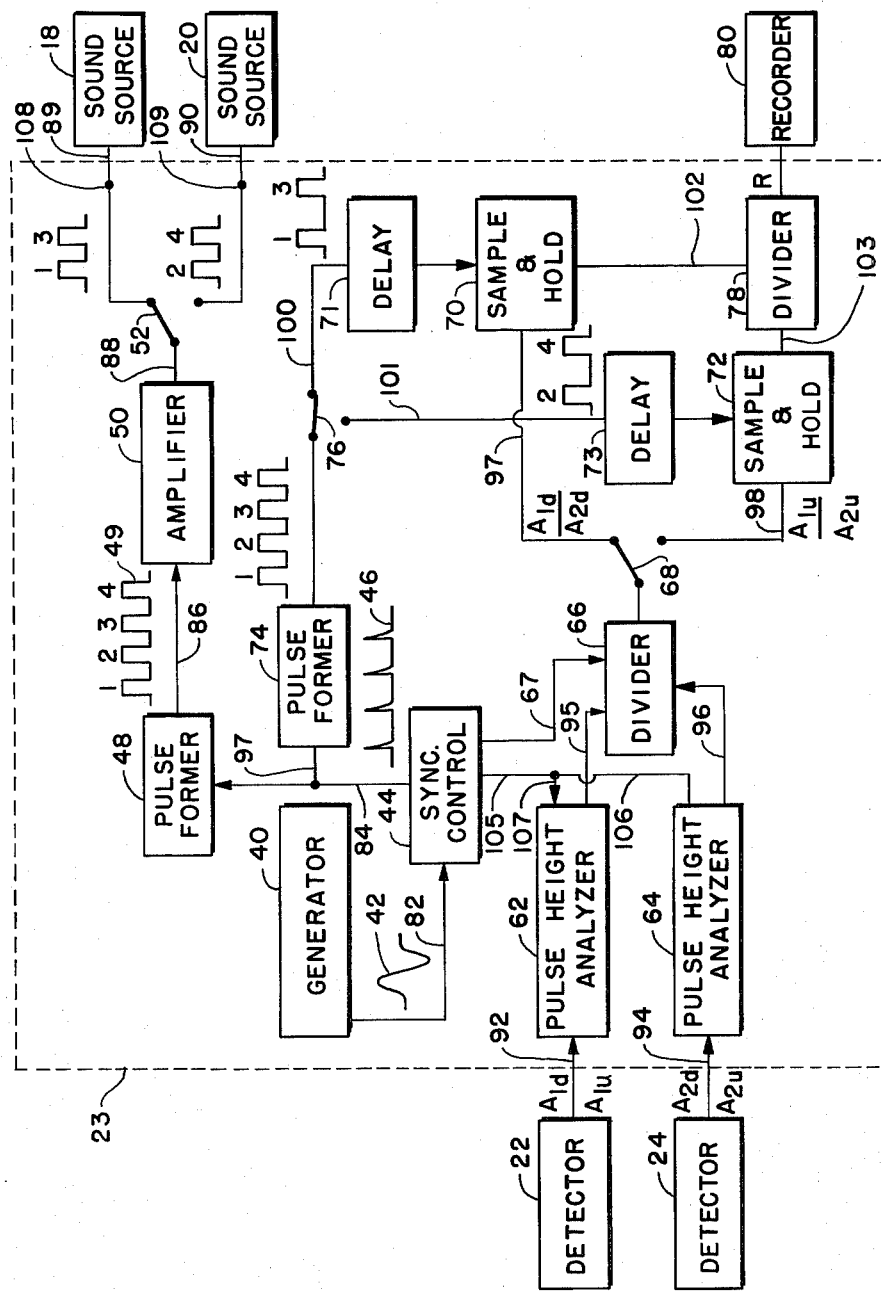
FIG. 3 illustrates schematically in block diagram form the amplitude ratio detector and sound actuator of FIG. 1.

FIG. 3 illustrates schematically in block diagram form one preferred embodiment of the amplitude ratio detector and sound source actuator identified in FIG. 1 by reference numeral 23. It is suitable for automatically carrying out the principles and system of this invention and is preferably located at the surface. A repetition generator 40 is provided. This repetition generator may be an oscillator having an output signal which is a sine wave as represented at 42. The frequency of sine wave 42 may vary considerably as desired depending upon the timing necessary in the remaining circuitry, the distance between the sound sources and sound detectors, etc. However, a frequency of about 10 cycles per second is believed suitable for most systems. The time between impulses from generator 40 should be greater than the time required for any appreciable amount of energy to travel from the first sound source 18 to the second detector 24 or from sound source 20 to detector 22. The output from repetition generator 40 is fed through suitable connecting line 82 to a synchronous control circuit 44.

The output of synchronous control circuit 44 is a series of sharp pulses 46 with each pulse representing a zero crossing, i.e. a change of signal polarity, of the reference signal 42. The output of synchronous control means 44 is fed through suitable connecting line 84 to pulse former 48 which generates a square wave 49 for each peak or spike of signal 46. The duration of each of the pulses of signal 49 can be controlled as well as its amplitude.

Signal 49 is fed through suitable connecting line 86 to power amplifier 50 which amplifies the square pulses sufficiently as necessary to produce the desired signal from the sound sources. The output of power amplifier 50 is fed through suitable connecting line 88 through switching means 52 and suitable connecting line 89 to a first sound source 18 and alternately through suitable connecting line 90 to a second sound source 20. Terminals 108 and 109 correspond respectively to taps $S_1$ and $S_2$ of element 23 of FIG. 1. Switching means 52 may be a mechanical relay controlled by synchronous control means 44 to alternately connect power amplifier 50 with sound source 18 and sound source 20; that is, a signal representing in time every other zero crossing of the reference signal is fed to the first sound source and the other signals are fed to the second sound source.

First receiver 22 and second receiver 24 are connected respectively to pulse height analyzers 62 and 64 by suitable connecting lines 92 and 94 respectively. Each pulse height analyzer is of a character to detect the maximum amplitude of the first cycle of a signal fed to it such as amplitude $A_{1d}$ of curve $D'_1$ of FIG. 2 and to amplify the detected amplitude as desired. In other words, transmitter 18 generates an acoustical signal $A_{01}$ (see FIG. 2) which is first detected by detector 22. The detected pulse is illustrated in curve $D'_1$ and has a maximum amplitude $A_{1d}$. Pulse height analyzer 62 determines and holds the maximum amplitude $A_{1d}$. The down-travelling pulse is detected by detector 24. The detected pulse is shown in curve $D'_2$. Pulse height analyzer 64 determines and holds the maximum amplitude $A_{2d}$. This amplitude will be held until each pulse height analyzer is reset for a new reading. This reset may occur by the new reading itself or when timing pulses from the synchronous control 44 are received by pulse height analyzers 62 and 64 through a main suitable line 105 and branch lines 107 and 106 respectively. As a general rule, pulse height analyzers 62 and 64 can be reset upon each actuation of sound source 18 or 20.

As one step of this stems is to obtain the ratio of the amplitude $A_{1d}$ with respect to $A_{2d}$ the outputs of pulse height amplifiers 62 and 64 (after each pulse height analyzer has operated on the first cycle of a pulse received from an actuation of sound source 54) are fed through suitable connecting lines 95 and 96 respectively to a divider circuit 66 which performs that operation. The pulse height analyzer is reset automatically by a pulse from synchronous control 44 so that the transmitted signal from sound source 20 received by the detectors can be measured to obtain the "pulse height" of $A_{2u}$ and $A_{1u}$. The ratio of the amplitude $A_{1u}$ with respect to $A_{2u}$ is also found by divider circuit 66 in a similar manner to $A_{1d}$ and $A_{2d}$. Divider circuit 66 is of a character that when commanded it will divide the signal received from pulse height analyzer 62 by the signal from pulse height analyzer 64. This command is delivered from the synchronous control circuits through line 67 at the proper time in the cycle after the receivers are quiet. The output signal of divider circuit 66 is held long enough for sample and hold circuit 70 or 72 (depending on which position switch 68 is in) to sample the output signal. In other words, divider circuit 66 holds the value representative of $A_{1d}$ divided by $A_{2d}$ and passes the result through switch 68 through lines 97 to sample and hold circuit 70. Divider circuit 66 then clears and prepares to divide amplitude $A_{1u}$ by $A_{2u}$ which are caused by the next power pulse to the second sound source 20. Pulse $A_{1u}$ is divided by $A_{2u}$ and the result passed through switch means 68, which has been moved to its alternate position, through line 98 to sample and hold circuit 72. The output of divider 66 then is fed through switching means 68 alternately to sample and hold circuits 70 and 72.

The output signal 46 from synchronous control means 44 is fed through suitable connecting line 97 to a pulse former 74 which generates a series of square pulses 1, 2, 3 and 4 etc. which are fed through switching means 76 alternately to sample and hold circuits 70 and 72. Switching means 68, 76 and 52 are preferably mechanical relay switches which are ganged together so that they may be opened and closed in synchronism. If desired, a short delay may be incorporated in switches 52 and 76 to cause them to delay switching until a short time after the switching of switching means 68. Sample and hold circuits 70 and 72 are each of a character to have an output signal whose amplitude is equal to, or proportional to, the input signal from divider 66 through switch 68 upon receiving a pulse through switching means 76.

Pulses 1, 3 etc. from pulse former 74 are passed through switching means 76 through suitable connecting line 100 to sample and hold circuit 70. Pulses 1, 3 etc. signal sample and hold circuit 70 to resample the signal fed to its from divider 66. A delay unit 71 may be placed in line 100 between switch 76 and sample and hold circuit 70. Likewise, the "even-number" pulses 2, 4 etc. are passed through switch 76 through suitable connecting line 101 to sample and hold circuit 72. A delay unit 73 may be placed in line 101 between switch 76 and sample and hold circuit 72. These delay units are synchronized with any delay in switch 68 so that sampling will occur at the proper time. The delay in switch 68 is synchronized with the overall system as stated above to pass $A_{1d}/A_{2d}$ to sample and hold circuit 70 and $A_{1u}/A_{2u}$ to sample and hold circuit 72.

The output signal of sample and hold circuit 70 and 72 are fed through suitable connecting lines 102 and 103 respectively to divider circuit 78 which divides the information (representative of $A_{1d}/A_{2d}$) from sample and hold circuit 70 by the information (representative of $A_{1u}/A_{2u}$) from sample and hold circuit 72. The output of divider circuit 78 is representative of R and is fed through suitable connecting line 104 to a recording means 80. R, as defined above, is then recorded on recording means 80. R can be recorded upon exponential paper if desired such that $\alpha$ is recorded and readable from the chart on recording means 80. Recording means 80 is responsive to measuring sheave 25 so that values of R are recorded for the right depth. Thus there is recorded a log of the attenuation constant of the rock over the interval surveyed.

As a practical matter all the components shown in FIG. 3 are at the surface except sound sources 18 and 20 and detectors 22 and 24. These "down-hole" components are "insulated" from each other in a conventional manner. They are shown supported from each other in a non-rigid manner.

In absolute theory, the logging tool should stay unmoved in the borehole until a pulse has been sent from each detector and both pulses received by both detectors. However, in practice the logging tool can be moved slowly through the borehole while the tool is in operation in such a manner that $C_1$ and $C_2$ do not change appreciably between the time the pulse from source 18 is received and the time the next succeeding pulse is received by the detectors from source 20.

In the above discussion of the development in the exponential equation, it was assumed that $L_3$ and $L_1$ were large compared to $L_2$. If $L_1$ and $L_3$ are large compared with $L_2$, any corrections due to geometric spreading out from the source will be minimized. Practical values for $L_2$ may be 1 to 3 feet and for $L_1$ and $L_3$, 6 to 10 feet. It is also preferred to make $L_3$ and $L_1$ the same length for simplicity of construction. However, it is not necessary that $L_3$ and $L_1$ be the same length because their value does not appear in the computation for R.

Although the invention has been described with a certain degree of particularity, it is understood that the present disclosure has been made only by way of example and that numerous changes can be made in the method and in the embodiments shown without departing from the inventive concept herein disclosed and it is desired, therefore, that only such limitations be imposed on the appended claims as are stated therein or required by the prior art.

What is claimed is:

1. A system for use in logging a subsurface formation penetrated by a well bore which comprises in combination: a first sound source; a second sound source spaced below said first sound source; a first detector and a second detector spaced from one another between said first and second sound sources; first measuring means connected to said first and said second detectors and of a character to measure the ratio $r_1$ of the magnitudes of a signal received at said first detector and at said second detector from said first sound source, second measuring means connected to said second and said first detector and of a character to measure the ratio $r_2$ of the magnitudes of a signal received by said first detector and by said second detector from said second sound source; dividing means connected to the output of said first and said second measuring means and of a character to determine the ratio of the ratios determined by the two measuring means.

2. An apparatus for logging a subsurface formation traversed by a well bore which comprises in combination: a first sound source; a second sound source spaced below said first sound source; a first detector spaced a distance of $L_1$ below said first sound source; a second detector spaced below said second sound source and said first detector, said second detector being a distance $L_3$ from said second sound source; means for determining the amplitude ratio of a signal as detected at said first and at said second detectors of a signal received from said first sound source; means for determining a second amplitude ratio of a signal as detected at said first detector and at said second detector received from said second sound source; and means to determine the ratio R between the two determined amplitude ratios.

3. A system as defined in claim 2 including recording means connected to the means to determine the ratio R.

4. A system for logging a subsurface strata penetrated by a well bore which comprises: means for generating a first acoustical signal at a first point in a well; measuring means for obtaining the first amplitude attenuation ratio of said first signal between a second point and a third point spaced vertically one from the other in a well bore, said second point and said third point being spaced vertically from said first point; second generating means for generating a second acoustical signal at a fourth point vertically from said first point beyond said third point; means for obtaining a second amplitude attenuation ratio of the second signal received at said second point and at said third point; and means to determine the ratio R of the amplitude attenuation ratio of the first signal with respect to the amplitude attenuation ratio of the second signal.

5. A system as defined in claim 4 including a recording means connected to the means to determine the ratio R.

6. An acoustic method of logging a well which comprises: generating a first acoustic pulse at a first point in a well, receiving said first pulse at a second point in said well displaced from said first point, receiving said first pulse at a third point in said well displaced further from said first point than said second point, said second and said third points being in essentially the same vertical direction from said first point; generating a second acoustic pulse at a fourth point in said well, said fourth point being beyond said third point vertically from said first point; receiving said second pulse at said third point; receiving said second pulse at said second point; measuring a first ratio of the magnitude of said first pulse as received at said second point and the magnitude of said pulse received at said third point; measuring a second ratio of the magnitude of said second pulse as received at said third point and the magnitude of said pulse received at said second point; and obtaining the ratio R between said first and said second ratios.

7. A method as defined in claim 6 in which said first, second, third and fourth points are moved vertically in the well bore in a fixed spaced relationship whereby the acoustical attenuation R of the strata is continuously determined.

8. A method of logging a well penetrating a subsurface strata which comprises: generating a first acoustical signal at a first point in a well; measuring the first ratio of the magnitude of said first signal as detected at a second point compared to the magnitude of the signal as detected at a third point, said second and said third points being spaced one from another vertically and in the same direction from said first point; generating a second acoustical signal at a fourth point vertically beyond said third point in said well bore; measuring the second ratio of the magnitude of said second signal as detected at said second point compared to the magnitude of the second signal as detected at said third point; and determining a ratio R of the first and second said ratios.

9. A method as defined in claim 8 in which said first, second, third and fourth points are moved vertically in the well bore in a fixed spaced relationship whereby the acoustical attenuation R of the strata is continuously determined.

10. In the logging of a subsurface formation through a well bore using a logging tool having a first and a second sound source with two spaced-apart sound detectors between said sound sources, the method which comprises: generating a first acoustical signal at said first sound source; receiving said first acoustical signal at said first and said second detectors; obtaining a first ratio of the magnitude of the first acoustical signal detected at said first detector as compared to the magnitude of the acoustical signal detected at said second detector; generating a second acoustical signal at said second sound source; detecting said second acoustic wave at said second and said first detectors; obtaining a second ratio of the magnitude of the second acoustical signal as detected at the first detector as compared to the magnitude of the signal detected at the second detector; and thereafter obtaining the ratio R of the first said ratio and the second said ratio.

11. A method as defined in claim 10 in which the logging tool is moved vertically in discrete steps within the well bore during logging operations.

12. A method as defined in claim 10 in which the logging tool is continuously moved vertically within the well bore during logging operations.

References Cited by the Examiner

UNITED STATES PATENTS 2,708,485  5/55  Vogel _____ 181—0.5
2,813,590  11/57  McDonald _____ 181—0.5

SAMUEL FEINBERG, *Primary Examiner.*

CHESTER L. JUSTUS, *Examiner.*